Figure 1:
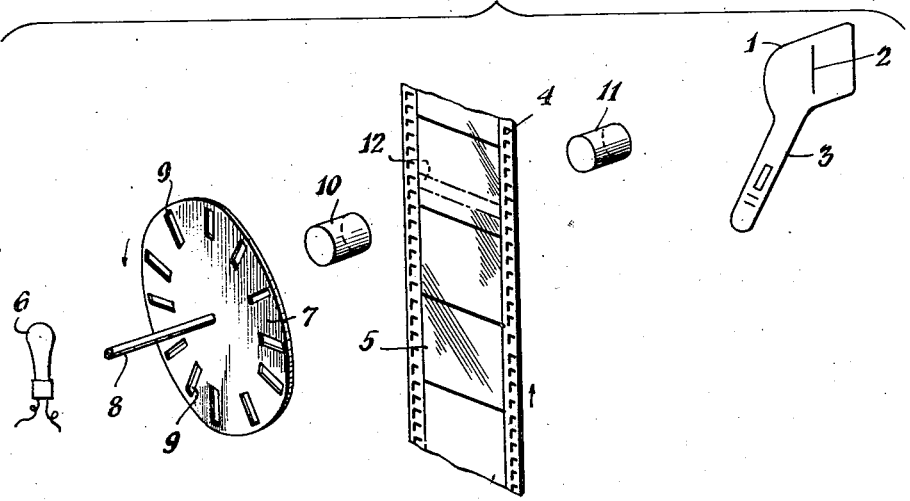

July 21, 1942.  C. E. HUFFMAN  2,290,592

TELEVISION SCANNING SYSTEM

Filed June 6, 1941

Charles E. Huffman, INVENTOR.

BY

Charles W. Mortimer, ATTORNEY

Patented July 21, 1942

2,290,592

UNITED STATES PATENT OFFICE 2,290,592

TELEVISION SCANNING SYSTEM

Charles E. Huffman, Montclair, N. J., assignor to Allen B. Du Mont Laboratories, Inc., Passaic, N. J., a corporation of Delaware Application June 6, 1941, Serial No. 396,793

3 Claims. (Cl. 178—7.2)

This invention relates to a television scanning system by means of which a visual image that is optically produced upon a photo emissive mosaic is converted into a series of electrical impulses that cause a complex electrical wave to be produced for transmission to a receiver for conversion into the object corresponding to the image. The invention is useful for direct pick-up of images from objects as well as images from a moving picture film passing through a projection machine.

In what is commonly known as "direct pick-up" the entire scanned area of the mosaic is continuously exposed to the complete optical image and the scanning beam traverses the mosaic in the presence of the light flux that conveyed the image to the mosaic. When the object for the image on the mosaic is provided by means of a moving picture film the mosaic is intermittently exposed only momentarily to the complete optical images in rapid succession one at a time between the end of one active scanning period and the beginning of the next one, with the result that the scanning beam traverses the mosaic during the time when no light flux is being conveyed from the film frames or pictures to the image on the mosaic.

Due to the fact that the mosaic fades rapidly because of electrical leakage when the light is cut off the result is that successively lower portions of the image from top to bottom are scanned at increasingly longer times after the light has been cut off and the image has faded correspondingly, so that the reproductions of the progressive lower portions of the pictures are increasingly more faded. By the present invention less than the entire scanned area of the mosaic is exposed to light flux forming the image at any particular time.

With the present invention a band or strip of light is caused to pass through the frames of the picture while they are in position to be projected upon the mosaic. This band or strip extends across the mosaic and moves downwardly over it with or slightly ahead of the scanning beam as it progresses along the mosaic on which the picture is focussed. In this way, successive areas of the mosaic are illuminated by the strip of light from the picture moving at a rate equal to the vertical rate of the electron scanning beam and timed so that the electron scanning beam is continuously within or continuously outside of the lighted area. In some cases of scanning film projected images it is desirable and possible to make the rates of vertical travel differ so that the illumination travels over the mosaic rapidly enough to permit film pulldown time to be different from beam blanking time. In either case the beam is timed to reach the respective areas of the mosaic before there is time for appreciable fading or diminution of the stored electrical charge. Also, due to the fact that the scanning beam follows the light strip on the mosaic very closely, excellent uniformity over the entire picture can be maintained with very little fading of any portion of the mosaic before it is scanned.

Figure 2:
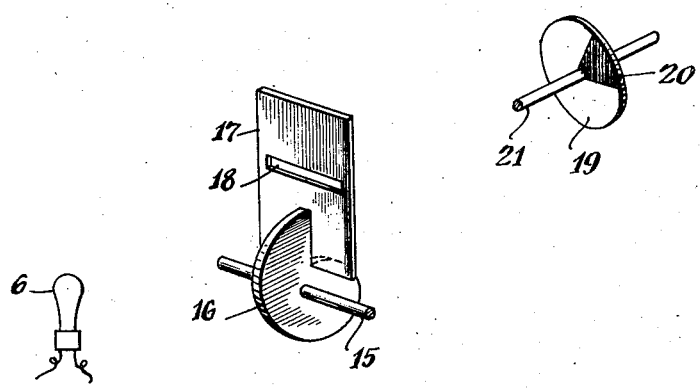

The invention may be understood from the description in connection with the accompanying drawing, in which:

Fig. 1 is a somewhat diagrammatic view in perspective showing an illustrative arrangement of apparatus for carrying out the invention; and Fig. 2 is a corresponding view of a modification of some of the parts.

In the drawing, reference character 1 indicates an iconoscope of the well known sort that is provided with a mosaic 2, an arm 3 for an electron gun, and other means for producing an electron beam and causing the same to scan the mosaic 2.

A small section of a moving picture film 4 is shown that is provided with the usual picture frames 5 on which the successive pictures are carried. The well known mechanism for moving the film at intervals at the desired rate to bring the frames succesively into position for projection is not shown, as standard devices of this sort are suitable for use in the present invention. Also the known ways for moving 24 film frames per second while 30 frames per second scanning is being used may be utilized.

A source 6 of light is so located that light from this source can reach the mosaic 2 after passing through the picture film 4.

A rotating disc 7 is mounted on a shaft 8 and is driven at a predetermined speed that is controlled in accordance with the picture film driving mechanism, so that synchronism between this disc 7 and the intermittent movement of the film 4 can be accurately maintained. A series of slots 9 is provided in the disc 7 in such position that the slots pass between the light source 6 and film 4 so that strips of light go through the film 4 and strike the mosaic 2. A condensing lens 10 is provided between the source of light 6 and the film 4, and a focussing lens 11 is provided between the film 4 and the mosaic 2. The lens 10 condenses the bands of light that pass through the slots 9 onto the film 4, and the lens 11 focusses the film and these bands of light, after they pass through the film, onto the mosaic 2. Each band 12 of light extends horizontally across the mosaic 2 and moves downwardly thereacross. The picture would be focussed upright on the mosaic 2 in the diagram shown.

The plate 17 in the modification shown in Fig. 2 may be used in lieu of the disc 7 to cause a strip or band of light to strike the film 4 and move therethrough at the desired time and with the desired speed longitudinally of the film frame in the same way as the light is caused to move by the revolving disc 7. In this modification a shaft 15 that is driven in synchronism with the mechanism that drives the film 4 has a cam 16 secured thereto. An opaque plate 17 has its lower edge resting upon the cam 16 and is provided with a slot 18 for passage of light therethrough from the light source 6 to the mosaic 2. A shutter 19 which may be in the form of an opaque sector 20 of a disc is carried by the shaft 21 which is driven in synchronism with the shaft 15 and moving picture driving mechanism so that the light from the source 6 is shut off from the mosaic 2 while the picture of each frame 5 is being moved into place.

The operation is as follows. The speed of the shaft 8 and spacing of the slots 9 are such that the slots are synchronized with respect to the electron beam that scans the mosaic 2 so that a strip of light which passes through a slot 9 is focussed upon the upper edge of the mosaic 2 and moves downwardly a short distance before the scanning of the upper portion of the mosaic 2 by the electron beam begins. The turning of the disc 9 causes the strip of light to move downwardly across the mosaic 2 slightly more rapidly than the scanning beam moves downwardly across this mosaic.

Since this invention provides a definite advantage when using a television scanning of 15 frames per second, its operation will be explained on the basis of 15 scanning frames or 30 partial scanning fields in the 2:1 interlace system, although it is not limited to such scanning. With 24 frames per second of motion picture film a system of film pull-down must be employed which allows field scanning every 1/30 second. One scheme for such scanning would utilize scanning of four successive frames of the motion picture film in four successive 1/30's of a second and the retention of this fourth frame for the fifth 1/30 of a second. Other methods of converting 24 frames average motion of the picture per second to 30 fields for television scanning may be used. This invention provides means whereby the motion picture film can be pulled down to a next frame position in an interval of time which is approximately the same as that used in standard motion picture projection practice. In projection practice approximately 25% of 1/24 second is allowed for pulling a new frame into position while the shutter cuts off the light. In the system of this invention the strip of light actually gains on the electron scanning beam so as to store up a longer interval of time for motion of the film than the interval provided for blanking in the electron scanning. The electron scanning systems use vertical blanking of about 7% of 1/30 second. Thus the strip of light must move ahead of the scanning electron beam sufficiently faster to provide about 25% of 1/30 second between the time that one strip leaves the bottom of the mosaic and the time the succeeding strip starts down at the top thereof. This is provided by suitable proportioning of the distance between slots 9 and the height of the mosaic 2 after taking the lens system into consideration.

In the modification shown in Fig. 2 the plate 17 with the slot 18 performs the same function as the series of slots 9 in the disc 7, and the shutter 20 prevents light from the slot 18 from causing a disturbance during its return travel. The plate 17 is placed quite close to the film.

In this application where the terms such as mosaic, light sensitive mosaic and photoemissive surface are used they are intended to include all photoelectric transducers.

Among the advantages of this invention may be mentioned the facts that light is maintained on the mosaic while scanning is taking place with intermittent film motion and the standard time for movement of film frames does not have to be shortened since the time for changing frames is not limited to the time of the electronic blanking interval; the leakage from the mosaic or decay of light on it is reduced because the time interval between cessation of illumination of the mosaic areas and scanning thereof is decreased; iconoscope scanning of mosaics illuminated by light through a moving picture film is made practical with low scanning field frequencies as well as others; there is no necessity to change the standard pull down interval of moving picture film frames; no excess intensity of light is required to offset leakage from the mosaic before the scanning beam arrives because the scanning beam arrives so quickly after the light charges the mosaic; the partial or band illumination helps to avoid saturation of the mosaic so that electron discharge is reduced; and direct pick-up of actual scenes is made more practical for television purposes.

What is claimed is:

1. In a system of the character described, means for scanning a light sensitive mosaic with an electron beam, means for projecting upon said mosaic a band of light that is narrower than the vertical height of said mosaic, and means comprising a reciprocating member for causing said band to move across said mosaic ahead of said beam and at a rate greater than the downward travel of said beam.

2. In a system of the character described, means for scanning a light sensitive mosaic with an electron beam, means for projecting upon said mosaic a band of light that is narrower than the vertical height of said mosaic, and means for causing said band to move across said mosaic ahead of said beam and at a rate greater than the downward travel of said beam.

3. In a system of the character described, means for scanning a light sensitive mosaic with an electron beam, means for projecting upon said mosaic a band of light that is narrower than the vertical height of said mosaic, means for causing said band to move across said mosaic ahead of said beam and at a rate greater than the downward travel of said beam, and means to shut the light off of said mosaic while said frame is being replaced by a succeeding frame.

CHARLES E. HUFFMAN.